L. WOODS.
SAFETY CLIP.
APPLICATION FILED OCT. 22, 1917.
1,324,091.
Patented Dec. 9, 1919.
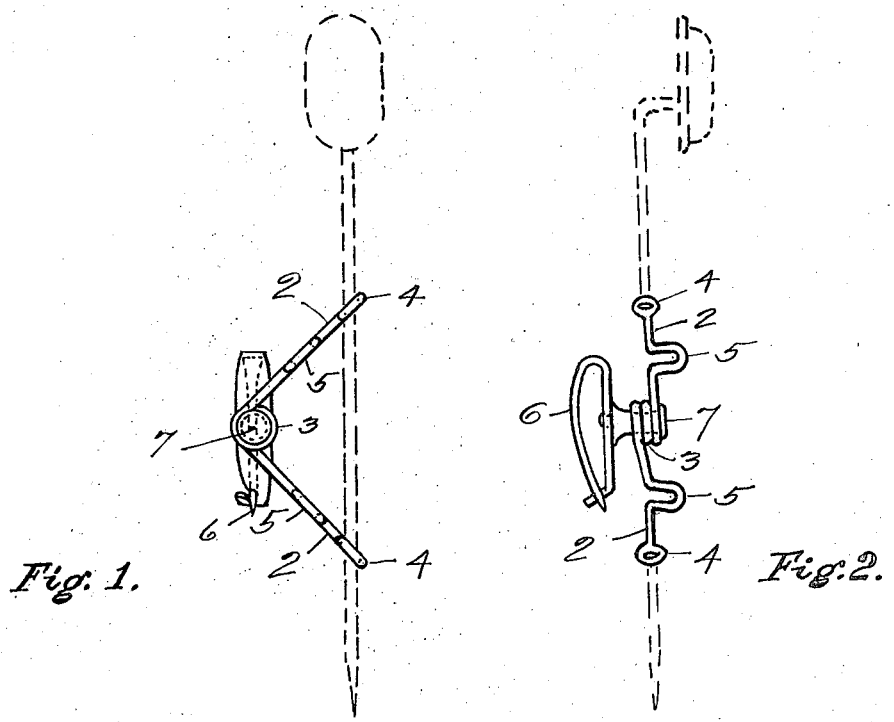
WITNESSES:
INVENTOR.
Leonard Woods,
BY
H. M. Plaisted,
ATTORNEY.

UNITED STATES PATENT OFFICE.

LEONARD WOODS, OF ST. LOUIS, MISSOURI.

SAFETY-CLIP.

1,324,091.　　　　Specification of Letters Patent.　　Patented Dec. 9, 1919.

Application filed October 22, 1917. Serial No. 197,973.

*To all whom it may concern:*

Be it known that I, LEONARD WOODS, a citizen of the United States, residing at St. Louis, State of Missouri, have invented certain new and useful Improvements in Safety-Clips, of which the following is a specification.

This invention relates to certain new and useful improvements in safety clips for stick-pins, pencils, and other objects for which it is adapted; the peculiarities, whereof, will be hereinafter described and claimed.

The object of my invention is to provide a clip adapted to maintain its grip upon a stick-pin, for example, so as to check its dislodgment from the cravat in which it is inserted, and to maintain the pin in its proper position therein.

In the accompanying drawing on which like reference letters indicate corresponding parts, Figure 1 represents a face view of a clip embodying my improvements, with a stick pin in dotted lines engaged thereby; and Fig. 2, a side view of the same.

2, 2 designate a pair of legs integrally connected to a coil spring 3 which tends to cause said legs to diverge with considerable force depending on the strength of the spring. At the outer ends of said legs are loops, preferably in the form of eyes 4, 4, which eyes are substantially on the same axis when said legs are brought into parallel position, one over the other, for the ready insertion of a stick pin or other similar object. These legs, however, when released from the compressive action of the thumb and finger, are forced outward divergently by said spring and cause the said eyes to assume an oblique position with regard to one another and to the pin inserted therein, and thereby grip the latter, as indicated in Fig. 1. Each eye binds on opposite sides of the pin, thus making four points of engagement. The smaller the pin with regard to the eyes, the wider the divergence of said legs under the spring tendency of the connecting coil.

Each leg preferably has a loop 5, or is otherwise shaped to present a flat bearing surface for the finger and thumb substantially in the same plane as the respective eye, to facilitate holding the clip. A fastening device, such as a spring pin, is secured to the clip, preferably by a pivot stud through the coil spring, by which the clip is fastened to the cravat, or elsewhere. Thus when the pin 6 is secured to the shirt, for example, the legs are compressed and the pin is inserted in the eyes thus brought close together, and is gripped by said eyes when the legs are released and the spring forces them apart. The pin is so firmly held by a double grip in two places that it is difficult to turn it on its axis; the desired adjustment of the face of the pin is thus secured.

If desired, the horizontal bearing loops 5 may be eliminated, but they are preferred for the ready manipulation of the clip as above described.

It is evident that my device may be used for other similar objects of larger diameter than a stick pin, such as a pencil, fountain pen, or the like, provided the eyes 4 or other form of loop at the ends of said legs, are made relatively larger. The clip is then held by its fastening device to the vest, or attached in any other way.

I claim:

A device of the character described, comprising a pivot stud 7, a spring pin 6 secured to one end of said stud for engagement to the shirt front, and a clip for engagement with the stick pin, and consisting of a coil spring 3, loosely encircling the neck of said pivot stud allowing free rotary movement, and having legs 2—2 diverging from said coil spring and compressible toward each other, and ending in eyes 4—4, substantially as shown.

In testimony whereof I have affixed my signature in the presence of two witnesses.

LEONARD WOODS.

Witnesses:
H. M. PLAISTED,
EARL FRED DOAK.